June 14, 1932.  H. W. DEISLER  1,862,924
ROAD GRADER AND THE LIKE
Filed Oct. 4, 1929  2 Sheets-Sheet 2
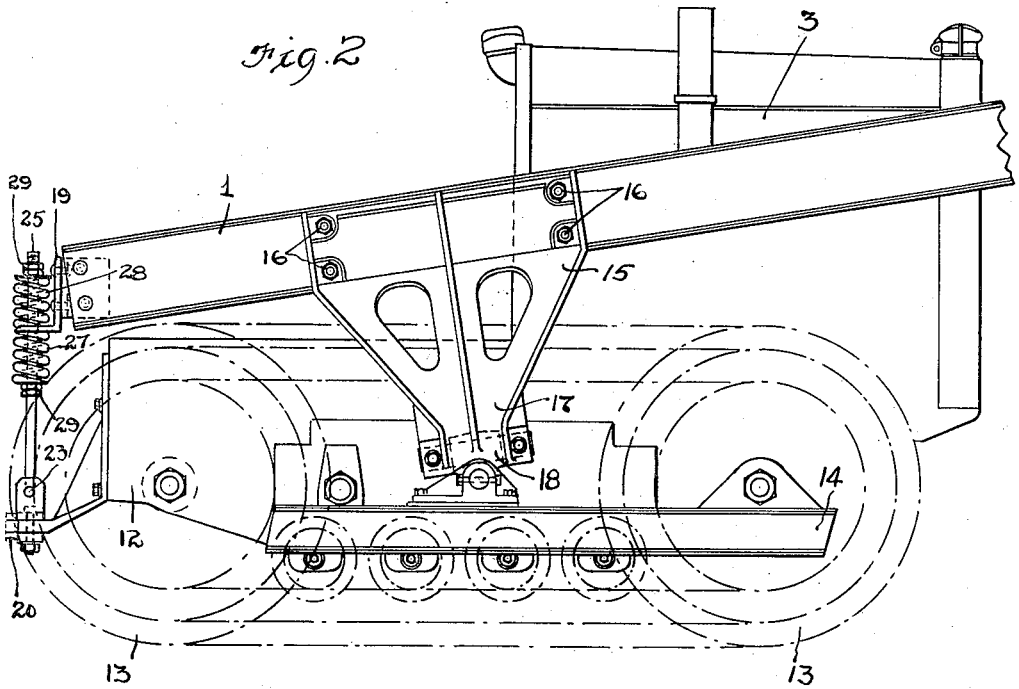
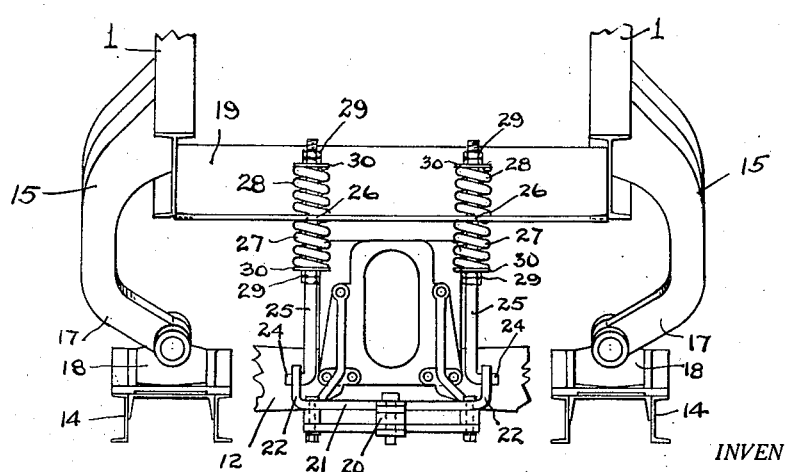
INVENTOR.
Harry W. Deisler
BY
Fay, Oberlin & Fay
ATTORNEYS.

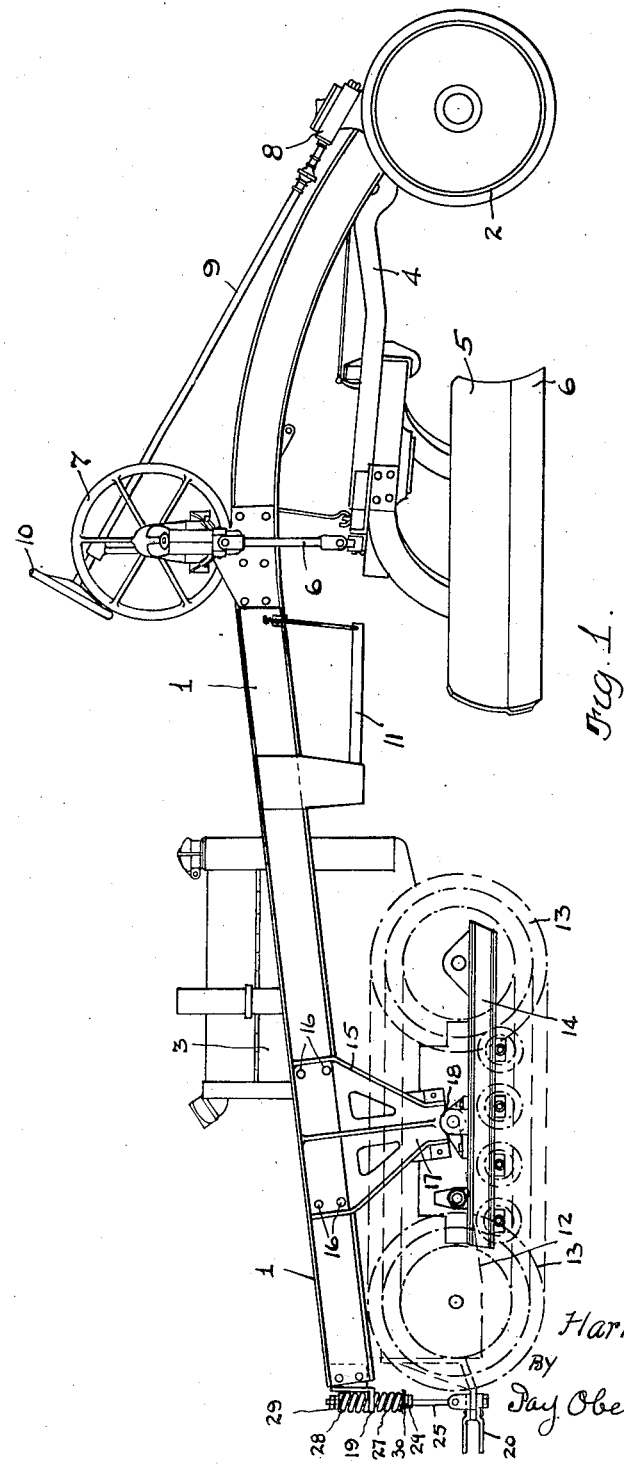

Patented June 14, 1932

1,862,924

UNITED STATES PATENT OFFICE

HARRY W. DEISLER, OF BUCYRUS, OHIO, ASSIGNOR TO W. A. RIDDELL COMPANY, OF BUCYRUS, OHIO, A CORPORATION OF OHIO

ROAD GRADER AND THE LIKE

Application filed October 4, 1929. Serial No. 397,358.

My invention as indicated relates to road graders and the like and has specific reference to the type of graders employing a tractor of the crawler type, which tractor is mounted integrally with such grader and serves as a propelling means as well as a support for the rear end of such grader machine. It is an object of my invention to provide a road grader and the like which is suitable to be supported upon and driven by a tractor of the crawler type. A further object of my invention is to provide a means by which the oscillation of such tractor with respect to the implement-carrying frame can be regulated or curtailed to bring about obvious advantages hereinafter more fully explained. Other objects of my invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevation of a road grader employing the principles of my invention; Fig. 2 is a fragmentary side view of a portion of the grader shown in Fig. 1; Fig. 3 is a broken fragmentary rear view of the mechanism shown in Fig. 2.

Referring more specifically to the drawings and more especially to Fig. 1, the road grader here shown, which is of the type employing a tractor of the crawler type as a propelling means as well as a means for supporting the rear end of such grader, has a main implement-carrying frame 1 extending substantially the entire length thereof to the forward end of which are attached suitable supporting and steering wheels 2. The implement-carrying frame 1 may be composed of bent I-beams which at the rear end of the grader lie on opposite sides of the tractor 3. The implement-carrying frame 1 has secured thereto and extending rearwardly of the front guiding wheels 2 an auxiliary frame structure 4, to which is secured an earth working tool or implement here shown to consist of a mold board 5 and a blade 6. The auxiliary frame 4 and its associated earth working implement are adjustably supported by a member 6 which is suitably actuated by controlling wheels 7. The steering wheels 2 are suitably controlled by a steering mechanism 8 actuated by the rod 9 to the end of which is secured the steering wheel 10. The main implement-carrying frame 1 has depending therefrom, rearwardly of the steering wheels and forwardly of the tractor unit, an operator's platform 11 so positioned as to allow convenient access by the operator to the controlling mechanism of the grader.

The tractor unit 3, which is of the common crawler type and which is disposed between the side elements or I-beams of the grader frame 1, consists of a main tractor body 12, track laying wheels 13 and crawler tread frames 14. It will be understood that the tractor here employed is of the type in which the crawler tread frames 14 on opposite sides of such tractor are capable of oscillation independently of each other as well as of the main body 12 of the tractor. To the implement-carrying frame 1 adjacent the crawler frames 14 are secured downwardly and inwardly extending supporting arms 15, more clearly shown on Figs. 2 and 3. These arms 15 are shown attached to the I-beams of the implement frame 1 by means of bolts 16, although it is to be understood that they might also be so connected by other suitable means, such as rivets or welding. The lower ends 17 of the arms 15 are mounted upon trunnion elements 18 which are in turn mounted upon the crawler tread frames 14. These trunnion elements 18 permit universal movement of the arms 15 with respect to the crawler tread frames 14.

At the rear end of the implement-carrying frame 1, i. e., between the rear ends of the I-beam elements of such frame, is connected by suitable means a bracket 19 which is here shown to be of the common type of steel angle. Secured to the rear end of the main tractor body 12 is the usual hitching means 20 to which may be connected any suitable type of implement. Secured to such hitching means is a bracket 21 which has its ends 22 bent upwardly as shown in Fig. 3 and in which ends are formed apertures 23 adapted to receive the bent ends 24 of the rods 25. The bracket 19 has apertures 26 formed therein to slidably engage the rods 25. The rods 25 have co-axially mounted therewith springs 27 and 28 which respectively lie on opposite sides of the bracket 19. These springs 27 and 28 are secured against axial movement on the rods 25 by means of lock nuts 29 and washers 30.

As hereinbefore stated, the manner in which the crawler tread frames are mounted with respect to the main tractor body permits such crawler tread frames to oscillate independently of each other as well as to oscillate with respect to the main body of the tractor. The trunnion elements 18 likewise permit oscillation of the opposite sides of the implement-carrying frame with respect to the crawler tread frames. It is therefore obvious that oscillation will take place with respect to the transverse axis of the tractor as well as the longitudinal axis thereof while such grader is operated over an irregular road surface. To regulate and appreciably cut down such oscillation I have provided the resilient means comprising the springs 27 and 28 in association with the other elements hereinbefore described.

It will be seen from the construction and arrangement of parts above described that I have provided means for resilient curtailment of excessive oscillation of the implement-carrying frame with respect to the tractor. This resilient means has the advantages in that it is centrally located with respect to the axis of the grading mechanism, thereby insuring against its being damaged or acting as an obstruction as it would if it were located on the sides of the grading machine. A further advantage of so locating this resilient means is that it is connected between the implement-carrying frame and the main body of the tractor, which factors assist materially in the efficient operation of this device. The location of the resilient means rearwardly of the tractor and at the end of the implement-carrying frame gives the added advantage of a moment arm through which it acts of considerable more length than has heretofore been utilized. The disposition of the two rods 25 with their associated springs in a transverse plane with respect to the axis of the tractor also assists in curtailing the oscillation in this plane.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a tractor of the crawler type having a main tractor body and oscillatory crawler tread frames, of an implement carrying frame structure projecting forwardly from said tractor, steering wheels supporting the forward end of said frame structure, universal couplings securing said frame structure to the crawler tread frames of said tractor, and resilient means connecting the rear of said frame structure with the rear end of said main tractor body.

2. The combination with a tractor of the crawler type having a main tractor body and oscillatory crawler tread frames, of an implement carrying frame structure projecting forwardly from said tractor, steering wheels supporting the forward end of said frame structure, downwardly extending arms attached to said implement carrying frame, universal couplings securing said arms to the crawler tread frames of said tractor, and resilient means connecting the rear of said frame structure with the rear end of said main tractor body.

3. The combination with a tractor of the crawler type having a main tractor body and oscillatory crawler frame, of an implement carrying frame structure projecting forwardly from said tractor, steering wheels supporting the forward end of said frame structure, a road grading implement movably attached to said frame structure rearwardly of said steering wheels and forwardly of said tractor, downwardly extending arms attached to said implement carrying frame, universal couplings securing said arms to the crayler tread frames of said tractor, and resilient means connecting the rear of said frame structure with the rear end of said main tractor body.

4. The combination with a tractor of the crawler type having a main tractor body and oscillatory crawler frame, of an implement carrying frame structure projecting forwardly from said tractor, steering wheels supporting the forward end of said frame structure, a road grading implement movably attached to said frame structure rearwardly of said steering wheels and forwardly of said tractor, an operator's platform supported within said frame structure forwardly of said tractor, downwardly extending supporting arms attached to said implement carrying frame, universal couplings securing said arms to the crawler tread frames of said tractor, and resilient means connecting the rear of said frame structure with the rear end of said main tractor body.

Signed by me this 1st day of October, 1929.

HARRY W. DEISLER.